United States Patent [19]

Kratochvil et al.

[11] 3,817,496
[45] June 18, 1974

[54] MIXING AND CONVEYING APPARATUS

[75] Inventors: Egon Kratochvil, Modling; Wladimir Hascic, Maria Enzersdorf, both of Austria

[73] Assignee: Semperit AG, Vienna, Austria

[22] Filed: Dec. 22, 1971

[21] Appl. No.: 210,692

[30] Foreign Application Priority Data
Dec. 23, 1970   Austria.................................. 11580

[52] U.S. Cl......................... 259/6, 259/97, 259/112
[51] Int. Cl................................................ B01f 7/08
[58] Field of Search............... 259/6, 21, 41, 64, 97, 259/104, 192, 112

[56] References Cited
UNITED STATES PATENTS

| 2,048,286 | 7/1936 | Pease................................ 259/192 |
| 2,434,707 | 1/1948 | Marshall......................... 259/104 X |
| 2,170,303 | 8/1939 | Helstrup......................... 259/104 X |
| 617,735 | 1/1899 | Godfrey........................... 259/21 X |

FOREIGN PATENTS OR APPLICATIONS

| 713,353 | 8/1954 | Great Britain........................ 259/6 |
| 958,372 | 2/1957 | Germany.......................... 259/104 |

*Primary Examiner*—Harvey C. Hornsby
*Assistant Examiner*—Alan I. Cantor
*Attorney, Agent, or Firm*—Ernest F. Marmorek

[57]  ABSTRACT

A mixing and conveying apparatus, especially for dual or more component synthetic resin systems wherein the apparatus comprises a housing rotatably supporting at least two threaded spindles or worms, the threading of which meshes with one another. The housing is provided with inflow and outflow channels for the processed material. According to important aspects of the invention the threaded worms are rotated in the same direction, a uniform play or gap is present between the spindles and the wall of the mixing compartment of the housing, and the lengthwise axes of the worms are disposed in a common or single plane.

7 Claims, 7 Drawing Figures

MIXING AND CONVEYING APPARATUS

BACKGROUND OF THE INVENTION

The present invention relates to a new and improved construction of mixing and conveying apparatus, especially for dual or more component synthetic resin systems, which apparatus is of the type embodying a housing provided with a mixing compartment, at least two threaded worms being rotatably mounted in the housing, the thread courses of which mesh with one another, and wherein material inflow and outflow channels are provided for the housing.

The prior art is familiar with constructions of mixing and conveying apparatus wherein a threaded worm possessing a cylindrical or conical jacket surface is arranged within a mixing compartment. The relationship between the mixing effect and the conveying effect can be varied as a function of the inclination of the thread courses, and a cleaning effect for the inner wall of the mixing compartment can be realized as a function of the rotational speed of the worm and in the case of conical worms by virtue of the axial displaceability of such conical worms. However, with these state-of-the-art constructions cleaning of the thread courses only occurs by virtue of the centrifugal forces and then at high rotational speeds.

Furthermore, it is known to the art, for instance in the case of rubber kneaders, to arrange two worms which counter-rotate and the thread courses of which mesh with one another, or to provide two worms, the axes of which are arranged at a certain angle with respect to one another, wherein sections of such worm are located in separate spaced compartments, the infeed channels for the components opening into said compartment sections. Owing to this construction it is intended to prevent premature interreaction of the components already at the region of the mouths of the inflow channels and clogging of such mouths.

A major drawback of all of these state-of-the-art constructions is the fact that either — during counter-rotation of both worms — there is not realized any material conveying effect in the axial direction, or while the walls of the mixing compartment are indeed automatically cleaned by the worms, nonetheless the threads of the worms themselves however increase in size with time and the worms therefore become ineffectual. It should be appreciated that the mixing and conveying effect is largely dependent upon the degree of soiling or contamination of the worms. Hence, these worms must therefore be exchanged and cleaned at relatively brief intervals.

SUMMARY OF THE INVENTION

Hence, from what has been stated above, it should be apparent that the art is still in need of a mixing and conveying apparatus which is not associated with the aforementioned drawbacks and limitations of the state-of-the-art constructions. Therefore, a primary objective of the present invention is to provide a new and improved construction of mixing and conveying apparatus which effectively and reliably fulfills the existing need in the art and is not associated with the aforementioned drawbacks and limitations of the prior art constructions.

Still a further significant object of the present invention relates to a new and improved construction of mixing and conveying apparatus for two or more component resin systems which is relatively simple in construction, economical to manufacture, extremely reliable in operation, affords good and positive self-cleaning action, thereby minimizing equipment downtime and the maintenance and service requirements.

Yet a further significant object of the present invention relat4s to a novel construction of mixing and conveying apparatus for synthetic resin materials wherein the worms are designed and operated in such manner that there is achieved an effective cleaning of the thread courses of the worms, resulting in less servicing and maintenance requirements, avoiding excessive replacement of the worms, downtime of the equipment, and allowing for shorter constructional design of the equipment itself.

Now in order to implement these and still further objects of the present invention which will become more readily apparent as the description proceeds, the inventive mixing and conveying apparatus comprises a housing containing a mixing compartment in which there are rotatably mounted the two threaded worms, the threading of which engages with one another. The worms are driven so as to rotate in the same direction, and between the worms and the wall of the mixing compartment there is provided a uniform play or gap, with the axes of the worms being disposed in a common or single plane. Owing to these measures it is possible for the worms to mutually clean themselves, whereas the mixing and conveying effect occurs in the space or gap between the worms and the inner wall of the mixing compartment. The material to be admixed essentially should remain in such gap and should not be drawn between the worms. In this connection it is advantageous if the smallest play between the worms is smaller than the play or gap from the worms to the inner wall of the mixing compartment. Owing to relatively high rotational speed of the worms the material is displaced away from the gap between the worms owing to the centrifugal force. In this regard it is important that the worms are not arranged so as to intersect one another. In so doing, it was necessary in order to obtain an interengagement of the flanks that the worms were designed thicker in the direction towards their ends, by virtue of the thus greater prevailing centrifugal force there occurred an acceleration of the material towards the ends. As a result the mixing effect could not be obtained; air inclusions tended to appear.

An additional turbulent effect for the mixing operation can be realized if the flanks of the worm threading are dissimilarly inclined. Consequently, the material will be conveyed more quickly from one worm, whereas it will be braked by the other worm.

An additional cleaning effect of the worm flanks can then be realized if the worms are movable towards one another in axial direction. Consequently, two oppositely situated surfaces of different worms will be briefly brought almost into contact with one another, so that residual material will be scraped away from the flanks of the worm threading. Of course, a prerequisite of this constructional embodiment is that the play between the worms and the wall of the mixing compartment is uniform. In this connection it is also to be mentioned that it is advantageous if the rotational speed of the worms is briefly reduced during this cleaning operation.

Additionally, it is advantageous if the worms and the housing are constructed so as to possess a conical configuration. As a result, the discharge or outlet opening can be reduced in size and the material can be introduced into the injection mold in a much more saving manner. A cleaning effect of the housing wall can then be realized if the worms are conjointly movable relative to the housing in the axial direction. As a result, the gap between the worms and the inner wall of the mixing compartment is reduced and again enlarged respectively.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
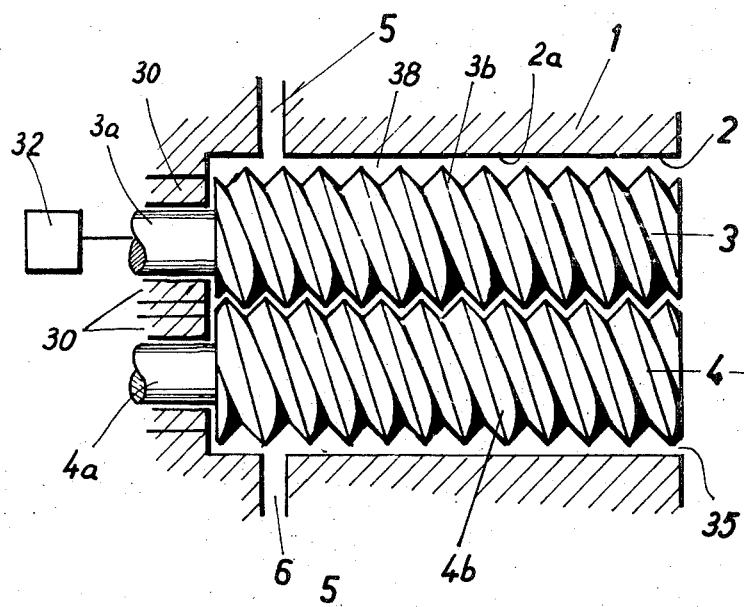
FIG. 1 is a fragmentary longitudinal sectional view of a first embodiment of inventive mixing and conveying apparatus.
Figure 2:
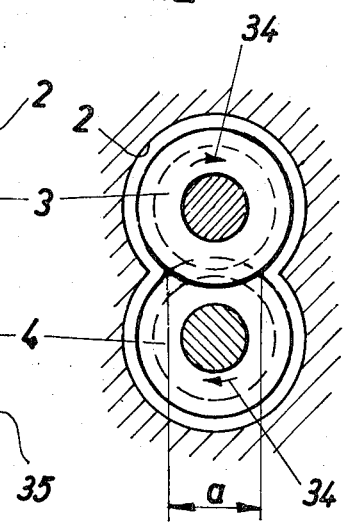
FIG. 2 is a cross-sectional view of the mixing and conveying apparatus depicted in FIG. 1.

Describing now the drawings, and referring first to the embodiment of mixing and conveying apparatus as depicted in FIGS. 1 and 2, it will be seen that such comprises a housing 1 containing a cylindrical mixing compartment or chamber 2 bounded by the inner compartment wall 2a. Within the mixing compartment 2 of the housing 1 there are arranged and rotatably supported two threaded worms or spindles 3 and 4. Each of the worms 3 and 4 is provided with a shaft 3a and 4a respectively. A suitable drive mechanism 32, which may for instance constitute gearing 7, 8 and 9 shown more specifically for the embodiment of FIG. 3, cooperates with the worms 3 and 4 so as to rotate same in the same direction, as indicated by the arrows 34 of FIG. 2. The drive mechanism 32 may be a variable speed drive for the purpose of reducing the peripheral velocity of these worms 3 and 4 during such time as these worms are shifted axially towards one another. To permit such axial shifting of the worms, the worm shafts 3a and 4a are mounted in any suitable mounting or support arrangement, schematically indicated by reference character 30 in FIG. 1. The invention is not limited to a specific construction of mounting arrangement for the worms 3, 4 to permit such to be axially shifted, and constructions suitable for this purpose are well known in this particular art. For instance, one such type of mounting arrangement has been taught in the copending U.S. application, Ser. No. 95,181, filed Dec. 4, 1970, entitled "Apparatus for Mixing and Conveying Materials," listing therein one of the coinventors of this application, Egon Kratochvil, and which application is assigned in part also to the asignee of this case, and to which reference may be readily had.

Continuing, and as best observed by referring to FIG. 2, the threaded worms 3 and 4 possess threading 3b and 4b which meshe with one another at the region a. Inflow channels 5 and 6 for the components to be admixed open into the mixing compartment 2 at one end region of the housing 1, as best seen by referring to FIG. 1. The other end of the mixing compartment 2 is open so as to provide an outflow channel or opening 35, at which location the admixed material departs from the mixing compartment 2. Further a substantially uniform play or gap 38 exists between the worms 3 and 4 and the inner wall 2a of the housing mixing compartment 2. The smallest play or gap between the worms 3 and 4 is smaller than the play or gap 38 extending from the worms to the inner wall 2a of the mixing compartment 2.

Figure 3:
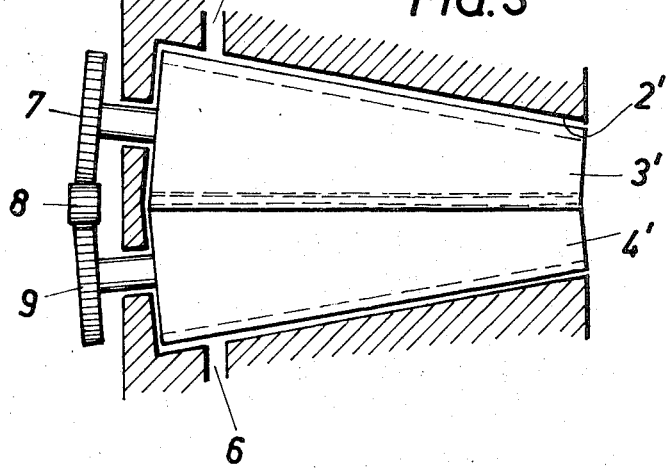
FIG. 3 is a longitudinal sectional view of a second embodiment of inventive mixing and conveying apparatus.
Figure 5:
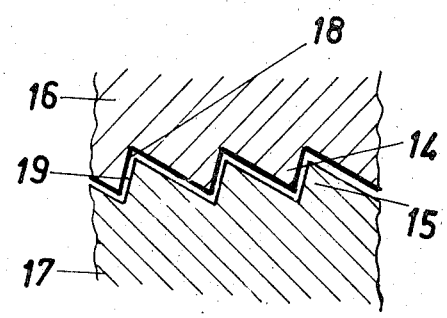
FIGS. 4 to 7 are fragmentary sectional views showing details of different constructions of the thread courses for the threaded worms used in the mixing and conveying apparatus constructions of FIGS. 1 to 3 inclusive.
Figure 4:
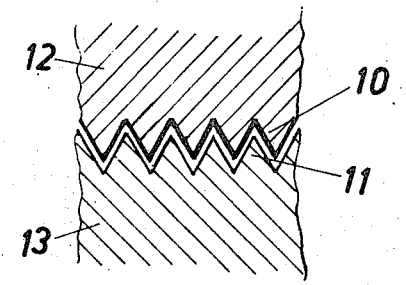

Concerning now the variant construction of mixing and conveying apparatus as depicted in FIG. 3 here the mixing compartment 2' possesses a conical construction. Within the conical mixing compartment 2' there are arranged for rotation two conical worms or spindles 3' and 4' which may be mounted as explained above so as to be axially shiftable. The worms 3' and 4' are preferably conjointly axially shiftable, and here also the smallest play between the worms is advantageously smaller than the play or gap from the worms to the inner wall of the housing mixing compartment. The worms 3' and 4' are operably connected in driving relationship with one another by any suitable means, such as spur or bevel gears 7, 8 and 9 so as to achieve a completely uniform rotational speed for both worms 3' and 4'.

Now in the embodiment of mixing and feed apparatus as depicted in FIGS. 1 to 3 inclusive the worms are driven so as to rotate in the same direction of rotation, the lengthwise axes of such worms are substantially located in a common or single plane, and a uniform play or gap is present between the worms and the inner wall of the associated mixing compartment.

FIGS. 4 to 7 inclusive illustrate different design possibilities for the threading of the worms. Hence with the embodiment of FIG. 4 the threads 10 and 11 of the worms 12 and 13 respectively, are designed so as to have equal flanks or legs, so that at both such worms 12 and 13 the same mixing effect is realized. With the embodiment of FIG. 5 the threads 14 and 15 of the worms 16 and 17 are designed so as to have dissimilar or unequal flanks or legs, so that with appropriate direction of rotation the steep flanks 18 intensively convey the material for instance, whereas the flanks 19 of the other worm brake or hold back such material. As a result, there is realized a very intensive admixing effect, so that the rotational speed of the worms can be reduced. Also the length of the worms can be reduced.

Figure 6:
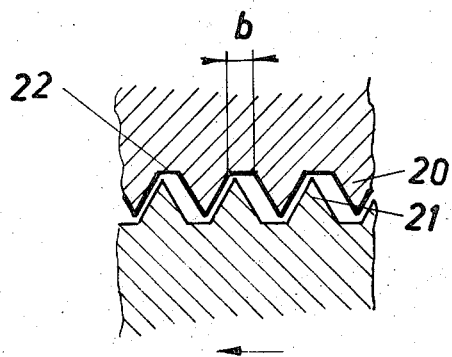
Figure 7:
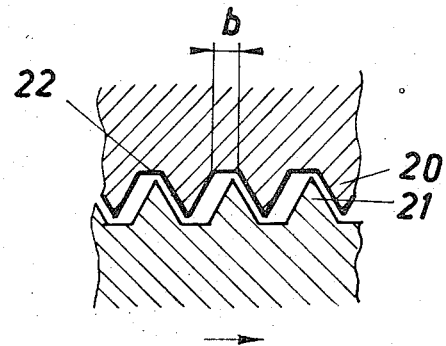

Now in FIGS. 6 and 7 there are illustrated special constructions of the threads, wherein the threads 20 and 21 are again designed so as to have equal flanks or legs, however the thread root or base 22 possesses a predetermined width b. By axially displacing the worms towards one another in one extreme position as illustrated in FIG. 6 the one pair of thread flanks approach one another almost to a point of coming into contact, and in the other extreme position the other pair of thread flanks approach one another almost to a point of contact so that in this case there is realized a particularly intensive cleaning effect.

While there is shown and described present preferred embodiments of the invention, it is to be distinctly understood that the invention is not limited thereto but may be otherwise variously embodied and practiced

What is claimed is:

1. A mixing and conveying apparatus, especially for the admixing of dual-or more component synthetic resins, comprising a housing provided with a mixing compartment bounded by an inner surface, at least two threaded worms rotatably mounted in said mixing compartment of said housing, the threading of said worms engaging with one another, material inflow and outflow channel means provided for said housing, drive means for rotating said worms in the same sense of rotation, said worms having their lengthwise axes disposed substantially in the same plane, said worms being spaced from the inner surface of said mixing compartment so as to provide a gap between the external surfaces of said worms and the inner surface of said mixing compartment sufficiently large to permit the mixing and conveying in said gap.

2. The mixing and conveying apparatus as defined in claim 1, wherein said threading of said worms possesses flank portions which are dissimilarly inclined.

3. The mixing and conveying apparatus as defined in claim 1, further including means for moving said worms in an axial direction towards one another.

4. The mixing and conveying apparatus as defined in claim 3, wherein said drive means for said worms includes mechanism permitting reduction of the peripheral speed of said worms during such time as said worms are moved towards one another.

5. The mixing and conveying apparatus as defined in claim 1, wherein said housing and said worms each possess a substantially conical construction.

6. The mixing and conveying apparatus as defined in claim 5, further including means for conjointly moving said worms relative to said housing in axial direction.

7. A mixing and conveying apparatus, especially for the admixing of dual-or more component synthetic resins, comprising a housing provided with a mixing compartment bounded by an inner surface, at least two threaded worms rotatably mounted in said mixing compartment of said housing, the threading of said worms engaging with one another, material inflow and outflow channel means provided for said housing, drive means for rotating said worms in the same sense of rotation, said worms having their lengthwise axes disposed substantially in the same plane, said worms being spaced from the inner surface of said mixing compartment so as to provide a gap between the external surfaces of said worms and the inner surface of said mixing compartment which is greater than the gap between said worms.

* * * * *